June 12, 1962    C. H. HOEPPNER ET AL    3,038,345
MAGNETIC DISPLACEMENT PICKUP
Filed May 17, 1957
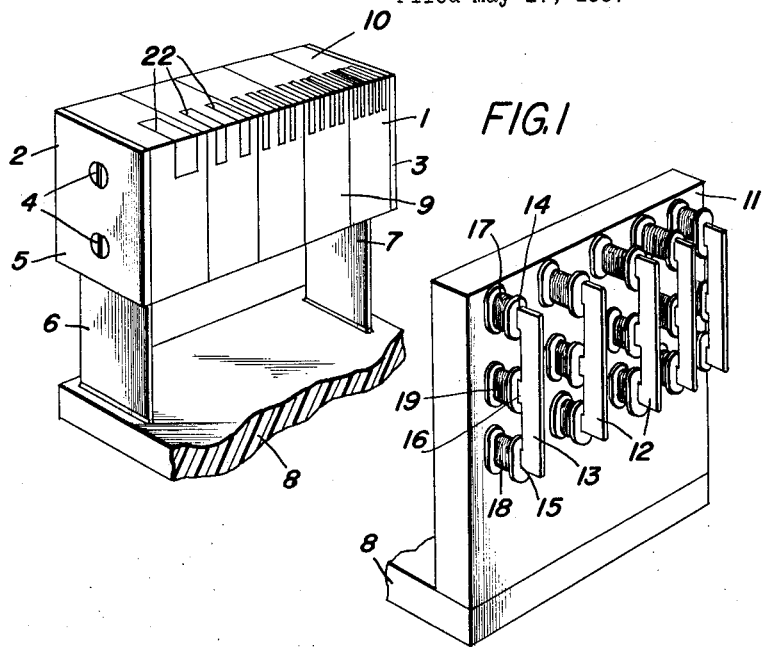
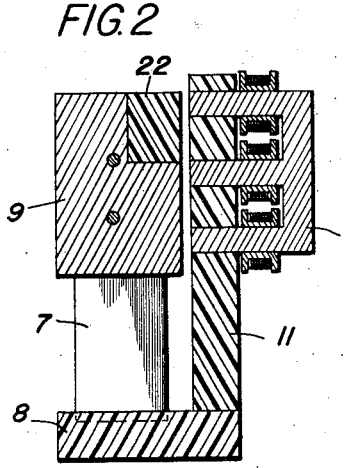
INVENTORS
*COWRAD HOEPPNER*
*LAVERGNE WILLIAMS*
BY *Hurvitz and Rose*
ATTORNEY

United States Patent Office 3,038,345
Patented June 12, 1962

3,038,345
MAGNETIC DISPLACEMENT PICKUP
Conrad H. Hoeppner and La Vergne E. Williams, Melbourne, Fla., assignors to Radiation, Inc., Melbourne, Fla., a corporation of Florida
Filed May 17, 1957, Ser. No. 659,823
15 Claims. (Cl. 73—517)

The present invention relates generally to displacement measuring transducers and more particularly to a displacement measuring transducer for producing digitally coded electric pulse representations of the relative physical displacement between two members.

It has been the practice in the field of displacement, velocity and acceleration measuring instruments to convert relative movement between a stationary member of a transducer and a condition responsive member of the transducer to an analog quantity indicative of the relative displacement between the members, the analog quantity, being in the form of a variable voltage or an amplitude or frequency modulated carrier voltage. Where the information derived from a displacement measuring transducer is to be employed in a system utilizing digital processing techniques; such as airborne telemetering equipment, the analog output quantity from the transducer is incompatible with the digital processing equipment and analog-to-digital converters must be employed. Due to the stability and accuracy which must be built into analog-to-digital converters employed in telemetering systems, the converters are generally of relatively large size and heavy weight and in consequence are not suitable for airborne operations where weight and space are at a premium. The usual practice has been to locate the converter at a ground station and transmit the analog information to the ground station for conversion at this point. The multiplexing of analog information, its recordation at a ground station and its separation from other information introduces appreciable errors into the system and the accumulated error from the various sorting operations may greatly exceed the individual errors in measuring and conversion.

It is, therefore, an object of the persent invention to provide a displacement-measuring transducer for producing a plurality of voltage pulses arranged in accordance with a predetermined digital code, the instantaneous value of the quantity represented by the code being a function of the relative displacement between two members of the transducer.

It is another object of the persent invention to provide a reliable, accurate, rugged and compact displacement measuring apparatus which produces digitally coded output voltage pulses.

In accordance with the present invention there is provided a displacement measuring apparatus particularly adapted to measure acceleration forces. It is to be understood that the apparatus is not to be limited to the measurement of acceleration, only, but may be employed to measure quantities which may be represented physically by the relative displacement betweeen two members, one of which may be fixed and the other of which may be stationary.

The accelerometer of the present invention comprises in the illustrated embodiment thereof, a mass of magnetic material mounted at both ends on resilient cantilever beams so that the mass is responsive to acceleration forces. Disposed adjacent a surface of the acceleration responsive mass is a body of non-magnetic material having supported therein a plurality of magnetic sensing devices having their smallest dimensions aligned with respect to one another in the direction of movement of the mass in response to acceleration forces. Each of the sensing devices comprises thin E-shaped core having two outer legs and one middle leg and each of the legs having a separate winding thereon. The winding on the center leg of the core is intended to be connected to a source of repetitive voltage pulses and the windings on the outer legs are differentially conected in series circuit so that upon equal voltages being induced in these latter two coils no net voltage is produced in the series circuit. If the magnetic path between the center leg and the two outer legs is balanced, that is, if the reluctance of these two paths is equal, then upon a voltage pulse being applied to the coil of the center leg, equal magnetic fluxes link the coils associated with the outer legs and equal voltages are induced therein resulting in no net voltage in the differential circuit. However, if the reluctance of the paths between the center leg and the two outer legs is unbalanced, the voltage induced in the coils associated with the magnetic circuit having a lower reluctance is greater than the voltage induced in the coil associated with the magnetic path having the higher reluctance, and a net output voltage is developed in the differential circuit.

In accordance with the present invention the acceleration sensing magnetic mass is provided with a plurality of non-magnetic inserts arranged with respect to the E-core sensing devices such that the gap between the center leg and one of the outer legs is always disposed opposite magnetic material of the mass, while the gap between the center leg and the other outer leg of the E-core is alternately disposed opposite magnetic and non-magnetic material as the mass is deflected relative to the sensing devices in accordance with acceleration. Each of the E-cores defines a region on the mass having a length equal to a maximum predetermined displacement between the transducers and the mass and the non-magnetic inserts are disposed within the various regions of the mass such that the output voltage pulse from each transducer defines a different digit of a multiple digit code. Where the apparatus is intended to produce a cyclic digital code, the width of the magnetic portions in each region are equal to the width of the non-magnetic portions of the same region. Further, the relative width of the non-magnetic portions of the various regions are determined by the type of cyclic code employed and the width of the portions in the region associated with the sensing device producing the least significant digit of the code determines the width of all of the E-shaped cores since it is this width that determines the smallest increment of movement that must be measured by each core.

In the preferred form of the present invention, the transducer is adapted to produce a five digit binary code and, therefore, utilizes five E-core sensing devices. The region associated with the core producing the least significant digit has sixteen non-magnetic inserts disposed therein while the regions associated with the other four transducers contain eight, four, two and one non-magnetic inserts in going from the second least significant digit to the most significant digits, with the width doubling in each region as the significance of the digits produced by the transducer associated with that region increases. In consequence, of the arrangement above, the output voltages produced by the various transducers, when taken as a whole, vary in accordance with a cyclic binary code, the instantaneous value of which is directly linearly related to the relative displacement between the transducers and the acceleration responsive mass.

It is to be understood that the code produced by the transducer may be a form other than the binary form and that the transducer mechanism may be the acceleration responsive mass while the body of the magnetic material may be the stationary mass, it not being intended to limit the present invention to a specific code or a specific acceleration responsive mass.

An important feature of the present invention, which allows a compact relatively light and extremely rugged instrument to be fabricated, is the alignment of the smallest dimension, the width, of the sensing devices in the direction of movement of the acceleration responsive mass. It is apparent that the E-cores may be aligned transverse to movement of the mass so that each transducer is associated with a region that is displaced from the other regions thereby insuring that there can be no interference between the inserts of one region and the core of another region. If E-shaped cores are employed in such an arrangement, the vertical height of the instrument would be unacceptably large and another form of sensing device, having a smaller vertical height, would be required. However, the E-core units are inexpensive devices which are not easily damaged and may be easily mounted and maintained in alignment by molding or otherwise supporting in a solid non-magnetic body. The alignment of the E-cores in the direction of movement of the acceleration responsive mass does present the problem that the displacement between the cores and the mass might be such that a region may be disposed opposite a core normally sensing a different region. This problem is easily met by properly calibrating the springs so that the maximum anticipated acceleration shifts each E-core only as far as the edge of its associated region. If the maximum acceleration is exceeded, the instrument responds but only at half its normal accuracy, and produces a four digit code which may be interpreted by skilled personnel. More specifically, by supplying pulses to the interrogating coil at a rate exceeding the maximum rate of variation of acceleration by several orders of magnitude, a series of values is obtained from the sensing devices which progressively increase until equilibrium is obtained between the spring force and the acceleration force. If this equilibrium is obtained with the elements displaced by more than one region on the mass then a series of five digit code readings are obtained followed by a series of four digit code readings which immediately indicates that normal deflection has been exceeded; the value of the four digit code indicating the overtravel to an accuracy of half normal accuracy.

It is, therefore, another object of the present invention to provide an accelerometer having an acceleration responsive mass and a plurality of electro-magnetic sensing devices so related that each sensing device producing an electrical signal which when taken in conjunction with the signals produced by the other sensing devices provides a plurality of pulses, coded in accordance with a predetermined cyclic code.

It is another object of the present invention to provide an accelerometer employing a fixed mass and an acceleration responsive mass and having a plurality of aligned transducers secured to one of the elements and having a plurality of non-magnetic inserts in the other of the bodies which is otherwise fabricated of magnetic material the inserts being arranged such that a composite of the voltage pulses produced by the transducers vary in accordance with a cyclic digital code.

These and other objects of the present invention will become apparent upon consideration of the following detailed description of one specific embodiment thereof, especially when taken in conjunction with the accompanying drawings, wherein:

FIGURE 1 is a perspective view of the transducer of the present invention;

FIGURE 2 is a cross-sectional view of the present invention taken through FIGURE 1;

FIGURES 3 and 4 are schematic diagrams of the operation of the E-core transducers employed in the apparatus of the present invention; and FIGURE 5 is a chart indicating the relative sizes of the transducer core and the magnetic insert and a relative displacement in accordance with acceleration.

Referring specifically to FIGURES 1 and 2 of the accompanying drawings, there is illustrated a transducer in accordance with the present invention designed to be employed as an accelerometer. The accelerometer comprises an acceleration representative mass 1 of laminated magnetic material secured between end plates 2 and 3 by appropriate means such as by bolts 4 and 5. The body 1 is supported on cantilever springs 6 and 7 having their upper ends secured to plates 2 and 3, respectively, and their lower ends secured as by welding to a base member 8. The magnetic body or mass 1 has a substantially square transverse cross-section and includes a vertically-extending surface 9 and an upper horizontal surface 10. Also secured to the base 8 is a support 11 for supporting a plurality of electro-magnetic sensing units 12. The block 11 is fabricated of non-magnetic material and supports the units 12 immediately adjacent the surface 9 of the mass 1, the block 11 and mass 1 being separated in FIGURE 1 for the purposes of illustration and clarity only.

Each of the sensing units 12 comprises an E-shaped core 13 having upper and lower legs 14 and 15, respectively, and an intermediate leg 16 equally spaced from the legs 14 and 15. Each of the three legs 14, 15 and 16 is provided with a separate coil 17, 18 and 19, respectively. The coil 19 is connected to a source of square wave voltage pulses and the coils 17 and 18 are connected differentially so that the voltages induced in the coils 17 and 18 by a voltage pulse applied to the coil 19 are of opposite polarity. When an armature such as the armature 20 of FIGURE 3 is disposed adjacent the ends of the legs 14 through 16 of the E-core 13 such that the magnetic paths between the legs 14 and 16 and 15 and 16, respectively, are of equal reluctance, and the voltages introduced in the coils 17 and 18 are of equal magnitude and the differential output from the two coils is substantially equal to zero. If an armature 21 as viewed in FIGURE 4 of the accompanying drawings, is provided in the magnetic path between the legs 14 and 16 only and the path between legs 15 and 16 is completed through a non-magnetic medium, then the reluctance of the former path is considerably less than that of the latter path and the voltage introduced in the coil 14 is substantially larger than the pulse introduced in the coil 15. In consequence, an output voltage pulse is developed in the differential circuit interconnecting the coils 14 and 15 when a voltage pulse is applied to the coil 16.

Referring again to FIGURES 1 and 2 of the accompanying drawings the E-shaped cores 13 are supported in the body 11 with the coils supported on their respective legs between the vertical member of the cores and the body 11. The legs extend through the body 11 to its inner surface adjacent the surface 9 of the body 1 and are supported by the body 11. The cores 13 are horizontally aligned with one another with their upper legs 15 adjacent the upper edge of the surface 9, and their lower legs 14 adjacent the lower edge of the surface 9.

The upper portion of the body 1 is provided with a plurality of non-magnetic inserts 22 arranged in accordance with a predetermined pattern as will be described subsequently. The vertical height of the inserts 22 is approximately equal to the distance between the upper edges of the legs 16 and 15 of the E-shaped cores 13 and are of such a depth that when the cores are disposed adjacent the inserts 22, the magnetic path between legs 16 and 15 is completed through a non-magnetic medium.

The length of the surface 1 is divided into five distinct and mutually exclusive regions which are defined by the maximum contemplated horizontal displacement between the bodies 1 and 11. Since the apparatus is intended to be employed as an accelerometer, these regions are determined by the maximum acceleration forces to which the apparatus is to be subjected taken in conjunction with the stiffness of the cantilever springs 6 and 7. Each of the regions defined by the E-shaped core and which are arbitrarily designated in FIGURE 5 as the regions A through C is provided with a predetermined number and arrangement of non-magnetic inserts 22 as determined by the code which it is desired to generate. In the specific embodiment of the invention illustrated in the accompanying drawings, the code generated is a cyclic binary code having a number of digits determined by the number of transducers employed which in the present instance is five.

A five digit binary code can selectively represent any number from 0 through 31 or thirty-two distinct digits by appropriate combinations of binary ones and zeros. A binary one is represented by an output pulse from the sensing devices and a binary zero is represented by the absence of an output pulse when the coil 16 is pulsed. It is apparent that the sensing devices 12 generate a binary one when disposed adjacent a non-magnetic insert 22 while generating a binary zero when disposed adjacent magnetic material. Since the five digit code may represent 32 different numbers, the region A of the mass 1, which is associated with the sensing device which produces the pulse representing the least significant digit of the code, must contain sixteen non-magnetic inserts spaced by sixteen magnetic regions, it being well-known that in a binary code the least significant digit alternates between a one and a zero with each number change. The second least significant digit of a binary code alternates at half the rate of the least significant digit so that the region B must carry eight non-magnetic inserts of twice the width of the inserts in region A and the width of the E-core associated with this region must be the same as the width of the E-core associated with the region A. With this arrangement of region B, the relative displacement between elements 1 and 11 required to produce a change of the state of the core associated with region B, is twice that required to produce a change of state in the sensing device associated with region B. By analogy, the regions C, D and E have four, two and one inserts 22 of three, four and five times the width respectively of the inserts of region A.

Referring again to FIGURE 1, the normal position of the mass 1 with respect to the cores is such that all of the cores are disposed adjacent the portions of the body 1 providing magnetic paths between the legs 15 and 16 of the cores. In consequence, upon a voltage pulse being applied to each of the cores, no voltage pulses are developed by any of the units.

In describing the operation of the apparatus of the present invention, reference is made to FIGURE 5 of the accompanying drawings which is a graphic representation of the operation of an accelerometer employing only three sensing devices 12. The large number of inserts required for a five transducer unit make it impractical to illustrate the operation of that large a unit.

Referring specifically to FIGURE 5, the upper row of horizontal lines 22 represents the position of the non-magnetic inserts in the body 1, and the gaps between these horizontal lines represent the segments of magnetic material between the non-magnetic inserts. The three regions are designated by the letters A, B and C, the boundaries of these regions being defined by the circular dots 24. The next row of horizontal lines each of which are of equal length represents the position of the transducers with respect to the body 1 when the apparatus is not subjected to an acceleration force. It will be noted that the width of the cores 13 are all equal to the width of the inserts 22 associated with the region A of the body 1 which represents the least significant digit of the code. The third row of horizontal lines represents a unit displacement due to acceleration between the sensing devices 12 and the magnetic mass 1 and it is noted that only the device 12 associated with the region A is disposed adjacent a non-magnetic insert. In consequence, if a voltage pulse is applied to all of the cores at this instant the cores associated with regions B and C produce no voltage output while the core adjacent the region A is subjected to an unbalanced magnetic path and produces a voltage pulse. The binary code thus produced is represented by the numerals one and zero disposed above each of the horizontal lines representing the position of a magnetic cores. The fourth row of horizontal lines represents the condition when the displacement between the sensing devices 12 and the mass is equal to two arbitrary units and the cores associated with the region B is the only one disposed adjacent a non-magnetic insert and therefore it is the only device 12 to produce a voltage output upon being interrogated. A further unitary displacement between the devices 12 and the mass 1 again brings the core associated with the region A adjacent a non-magnetic insert while the core associated with region B remains opposite a non-magnetic insert since the inserts associated with region B are equal to twice the width of the cores. Therefore, the two right hand sensing devices 12 produce output voltages pulses upon being interrogated. The last row of horizontal line represents a condition when a displacement between transducers and core is equal to four arbitrary units, in which condition, only the device 12 associated with regions C is disposed adjacent a non-magnetic insert and therefore is the only transducer to produce a voltage pulse while being interrogated.

It will be noted by reference to the binary code associated with each line that the apparatus of the present invention provides a cyclic binary code which varies linearly with relative displacement between the sensing devices 12 and the body 1. The binary code produced for each displacement discussed above is indicated at the right-hand side of the drawing while the decimal equivalent is indicated by the column of numbers at the left-hand side of the drawing. It is obvious to one skilled in the art that selected other codes may be employed rather than the binary code illustrated and described and it is not intended to limit the scope of the present invention to the utilization of a specific code.

In FIGURE 1, the body 1 is illustrated as supported on cantilever springs 6 and 7 and therefore constitutes the acceleration responsive body. It is also within the scope of the present invention to rigidly support the body 1 and resiliently mount the body 11 so that the transducer elements and associated support 11 are the acceleration responsive mass, this form of the invention actually being illustrated in FIGURE 5 wherein the lines representing the inserts 22 remain fixed while the lines representing the cores 13 are shifted.

It is readily apparent that the apparatus of the present invention provides a relatively small acceleration responsive instrument having a high degree of accuracy which is limited in range only by the number of sensing devices 12 employed. The utilization of five sensing devices produces a five digit code which is accurate equal to an accuracy of approximately 5%. Obviously, by increasing the number of sensing devices and therefore a number of binary digits in the code, the accuracy of the instrument may be greatly enhanced.

As previously indicated, the apparatus of the present invention provides a compact and extremely rugged displacement transducer in consequence of employing E-core sensing devices aligned in the direction of movement of the acceleration responsive mass and of the mounting of the cores in a unitary member. Such alignment permits relatively close packing of the cores 13 without reducing the accuracy of the instrument. In the event that the instrument is subjected to excessive forces and the cores become disposed opposite the region normally associated with another core, the results are rendered intelligible by supplying interrogating pulses to the coil 16 at a high rate compared to the rate of movement of the mass 1 with respect to the block 11. A series of five digit readings are therefore obtained prior to the mass exceeding its normal maximum displacement at which time five digit codes are produced. This change of code may be readily interpreted by skilled observers. The circuitry for pulsing the coils 19 of the transducers 12 and for determining the code output from the transducers are not illustrated since the techniques involved are well-known in the art and form no part of the present invention.

It should be noted, however, that all of the coils 16 may be pulsed simultaneously to produce a parallel code or may be pulsed in succession to produce a series code.

It has been stated that the width of the E-cores is equal to the width of the magnetic portions of the region E of the mass 1. It has been found in practice that better resolution may be obtained if the width of the E-core associated with region A is slightly smaller than the width of the other cores.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What we claim is:

1. An accelerometer comprising a body of normally unmagnetized magnetic material, a plurality of electromagnetic transducers disposed adjacent said body, means for producing relative motion between said body and said transducers in accordance with the magnitude of acceleration forces to be measured, means for aligning said transducers in the direction of relative movement between said transducers and said body, said transducers defining a plurality of mutually exclusive and aligned regions on said body having lengths equal to a maximum predetermined displacement between said transducers and said body, each of said regions having discrete non-magnetic means disposed therein and aligned in said direction of relative movement, each of said transducers having means for producing an electrical signal when said transducer is disposed adjacent a non-magnetic body, said non-magnetic bodies being arranged in their respective regions such that the instantaneous electrical signals produced by each of said transducers constitutes a distinct digit of a predetermined digital code consisting of all of said electric signals wherein each of said transducers comprises an E-shaped magnetic core having two outer legs and a center leg, and means for arranging said core with respect to said magnetic body so that the gap between said center leg and one of said outer legs is always disposed adjacent a magnetic portion of said body and the gap between said center leg and the other of said outer legs is disposed alternatively adjacent magnetic and non-magnetic portions of said body depending upon the displacement between said transducers and said magnetic body.

2. In combination, a body of normally unmagnetized magnetic material having at least one substantially flat surface, a plurality of aligned electro-magnetic transducers disposed closely adjacent to said surface, means permitting relative motion in the direction of alignment of said transducers between said transducers and said body in accordance with a quantity to be measured, said transducers defining mutually exclusive regions each having a length determined by a maximum predetermined displacement between said transducers and said body, each of said regions containing non-magnetic means aligned along the direction of alignment of said transducers, each of said transducers having means for producing an electrical signal when said transducer is disposed adjacent a non-magnetic body, and means for arranging said non-magnetic bodies in said regions so that the instantaneous electrical signals produced by each of said transducers constitutes a distinct digit of a predetermined digital code, wherein each of said transducers comprises an E-shaped magnetic core having two outer legs and a center leg, and means for arranging said core with respect to said magnetic body so that the gap between said center leg and one of said outer legs is always disposed adjacent a magnetic portion of said body and the gap between said center leg and the other of said outer legs is disposed alternatively adjacent magnetic and non-magnetic portions of said body depending upon the displacement between said transducers and said magnetic body.

3. The combination in accordance with claim 2, wherein each of said transducers further comprises, a separate coil disposed about each of said legs, means for differentially connecting the coils associated with said outer legs and means for connecting said coil associated with said center leg to a source of voltage pulses.

4. The combination in accordance with claim 1 further comprising a pair of cantilever springs and means for securing said body to the free ends of said springs.

5. In a system for measuring displacement of one body relative to another, a first body containing plural regions, each of said regions containing an array of elements having alternately different magnetic permeabilities, the elements of different ones of said regions being dimensionally arrayed to represent different components of a digital code, a second body, said second body comprising a plurality of permeability sensors associated one for one with said regions and each arrayed to provide a zero or one signal according to its location relative to said elements, said permeability sensors including each a normally balanced but unbalanceable magnetic circuit in response to different magnetic permeabilities of said array as said first and second bodies translate relative to each other.

6. The combination according to claim 5 wherein said permeability sensors each includes two sections, one of said sections being responsive to said array of elements, a coil associated with each of said sections, and means connecting said coils in opposition.

7. A transducer system, comprising a first body of normally unmagnetized magnetic material, a plurality of discrete and separate second bodies of a non-magnetic material disposed in said first body and entirely above a line therein, said second bodies having equal lengths and separations in the direction of said line, a sensor comprising an E-shaped magnetic body having a central leg and two side legs, said central leg and one of said side legs facing said first body and located entirely below said line, the remaining one of said legs facing said first body and being above said line.

8. In combination, a body of material having a surface, a plurality of electro-magnetic transducers disposed closely adjacent to said surface, said bodies and said transducers being relatively moveable in the direction of alignment of said transducers and defining mutually exclusive regions of equal length, each of said regions including elements of lower permeability separated by areas of higher permeability arrayed in the direction of alignment of said transducers, each of said transducers including means for producing an electrical signal when said transducer is disposed adjacent one of said elements of lower permeability, and means for arraying said elements so that the instantaneous electrical signals produced by said transducers constitutes a digital code, said transducers each comprising an E-shaped magnetic core having two outer legs and an inner leg, said cores being so disposed with respect to said body that the gap between said center leg and one of said outer legs is always disposed adjacent an element of higher permeability and the gap between the center leg and the other of said outer legs is disposed alternatively adjacent elements of lower and higher permeability as a function of said relative displacement.

9. The combination according to claim 8 wherein each of said tranducers includes a signal input pulse on said center leg and signal output coils on said outer legs, said signal output coils being differentially connected.

10. In combination, a magnetic body having a solid magnetic region below a line, a region of alternate magnetic and non-magnetic elements above said line, and arrayed along said line, said magnetic and non-magnetic elements occurring in alternation and being of equal extent in the direction of said line, and a magnetic read out moveable with respect to said body in the direction of said line and magnetically coupled thereto, said read out including an element continuously above said line and an element continuously below said line means for applying electrical energizing signals to said read out, and means for deriving output signals from said read out in response to said electrical energizing signals.

11. In combination, a body having a region of uniform high permeability only below a line and a region having elements of alternately high and low magnetic permeability only above said line and arrayed along said line, said elements being all of equal extent in the direction of said line, and a magnetic read out for said body including a component scanning said body only above said line and a component scanning said body only below said line, said body and said read out being relatively moveable in the direction of said line.

12. In combination, a code bearing body having a region of higher uniform value of a predetermined characteristic located entirely on one side of a line and a region having elements of alternately higher and lower values of said characteristic located entirely on the other side of said line, said elements being arrayed along said line and being all of equal dimensions, and a read out for said body, said read out including a sensing element scanning said body only on one side of said line and a sensing element scanning said body only on the other side of said line.

13. The combination according to claim 12 wherein is provided means for energizing said read out and said sensing elements including differentially connected signal output devices responsive to said means for energizing.

14. The combination according to claim 13, wherein said elements are sensing elements for sensing the values of said characteristics.

15. The combination according to claim 14 wherein said characteristic is magnetic permeability.

References Cited in the file of this patent

UNITED STATES PATENTS

| | | |
|---|---|---|
| 1,986,807 | Gillmor | Jan. 8, 1935 |
| 2,210,970 | Bonell | Aug. 13, 1940 |
| 2,245,373 | Weis et al. | June 10, 1941 |
| 2,359,158 | Rushing et al. | Sept. 26, 1944 |
| 2,445,455 | Rights | July 20, 1948 |
| 2,450,192 | Freeman | Sept. 28, 1948 |
| 2,484,022 | Esval | Oct. 11, 1949 |
| 2,552,722 | King | May 15, 1951 |
| 2,560,946 | Gossick | July 17, 1951 |
| 2,698,930 | Gutterman | Jan. 4, 1955 |
| 2,848,698 | Howey et al. | Aug. 19, 1958 |
| 2,897,462 | Brower | July 28, 1959 |

OTHER REFERENCES

Pub.—Kliever: "Control Engineering," vol. 2, issue II, pp. 77–80, November 1955.